June 16, 1931.  H. F. KURTZ  1,810,216
VEHICLE LIGHT
Filed Feb. 15, 1929   2 Sheets-Sheet 1
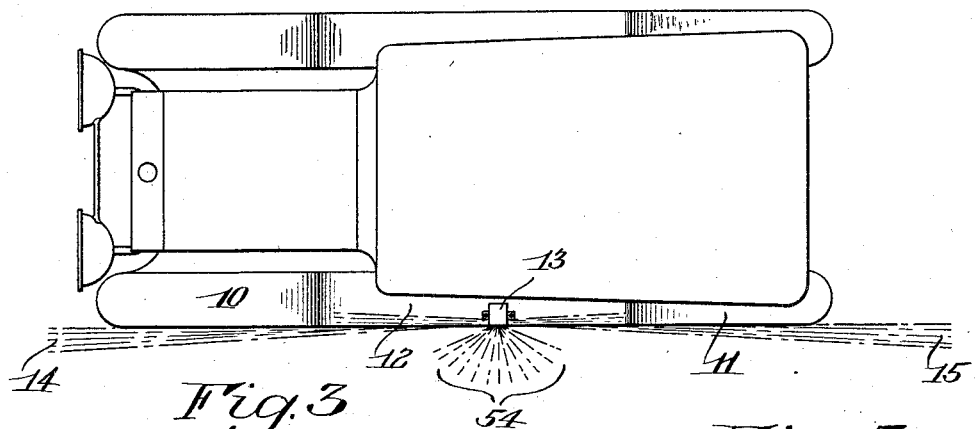
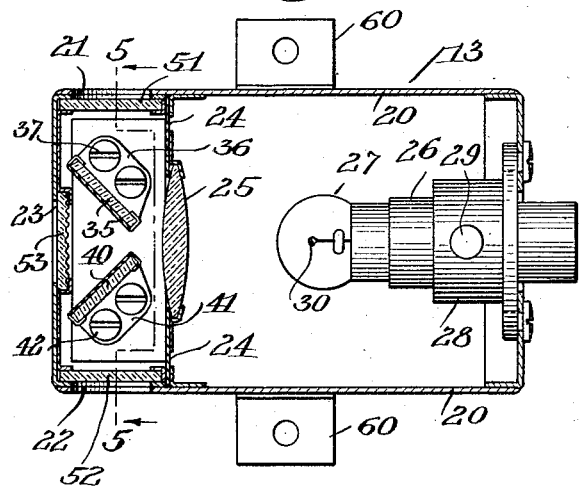
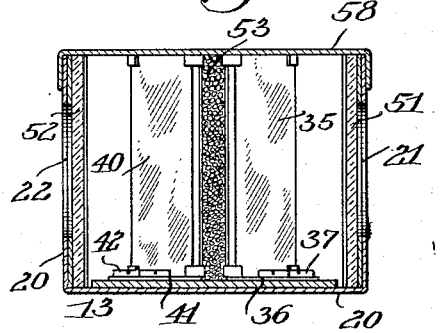
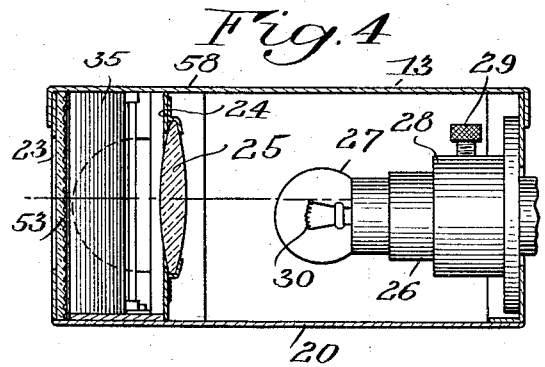
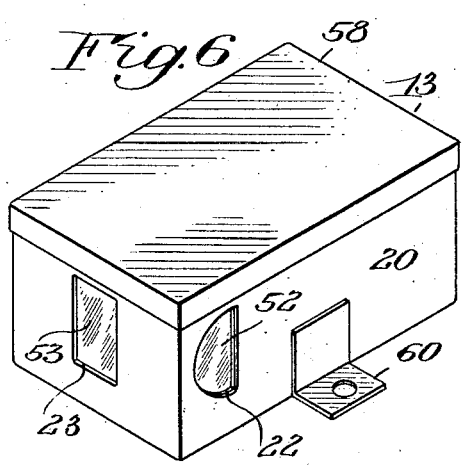
INVENTOR
Henry F. Kurtz
BY
Cumpston & Griffith
his ATTORNEYS June 16, 1931.  H. F. KURTZ  1,810,216
VEHICLE LIGHT
Filed Feb. 15, 1929   2 Sheets-Sheet 2
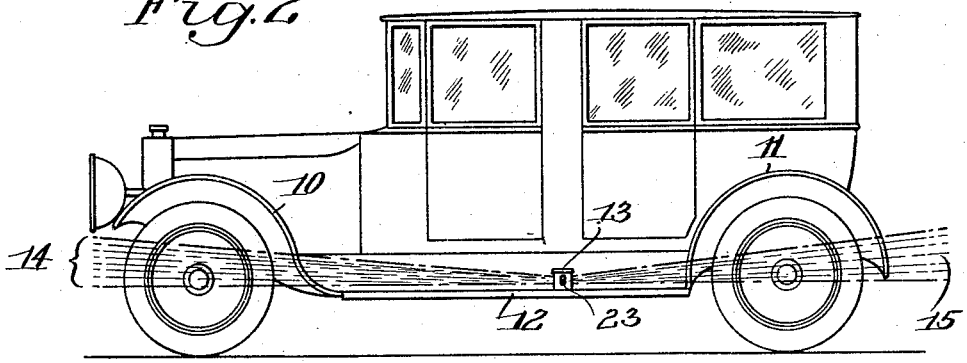
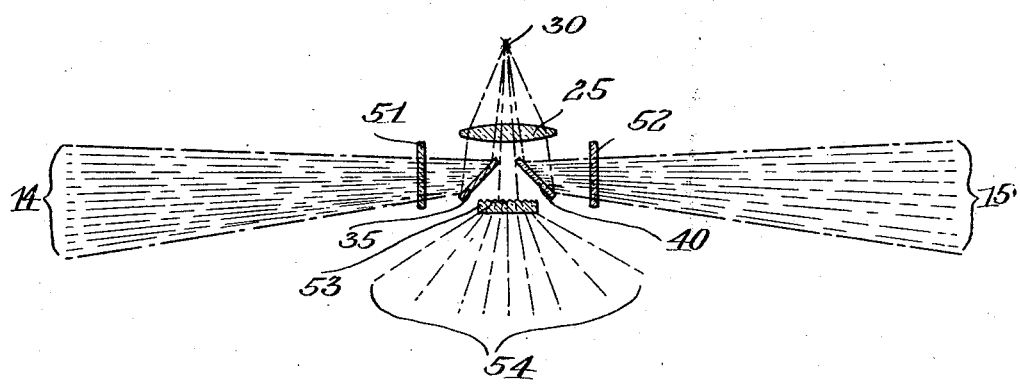
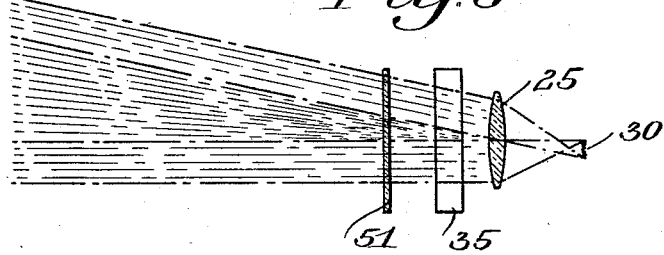
INVENTOR
Henry F. Kurtz
BY
HIS ATTORNEYS Patented June 16, 1931

1,810,216

UNITED STATES PATENT OFFICE

HENRY F. KURTZ, OF ROCHESTER, NEW YORK, ASSIGNOR TO BENNEVILLE LLOYD SINGLEY, OF MEADVILLE, PENNSYLVANIA

VEHICLE LIGHT

Application filed February 15, 1929. Serial No. 340,193.

This invention relates to an illuminating unit for vehicles such as automobiles, and has for its principal object the provision of means for throwing light in a novel and improved way to promote safe driving at night.

Another object of the invention is the provision of an illuminating unit of novel construction which is easy and comparatively inexpensive to build, and not likely to get out of order, which will satisfactorily project light in a way to decrease the hazards of night driving, and which may be used also as a satisfactory and efficient parking light.

A further object is the provision of illuminating means so designed and placed that the edges of the fenders of an automobile will appear in sharp relief or silhouette to persons in front of or behind the automobile, thus enabling automobiles to pass each other at night with greater safety.

To these and other ends the invention resides in certain improvements and combinations of parts, all as will be hereinafter more fully described, the novel features being pointed out in the claims at the end of the specification.

In the drawings:

Fig. 1 is a plan of an automobile body illustrating a preferred embodiment of the invention applied thereto;

Fig. 2 is a side elevation thereof;

Fig. 3 is a horizontal section through a preferred form of illuminating unit;

Fig. 4 is a vertical section taken centrally through the unit in a longitudinal direction;

Fig. 5 is a transverse vertical section on the line 5—5 of Fig. 3;

Fig. 6 is a perspective view of the unit;

Fig. 7 is a plan view illustrating diagrammatically the optical principles of the illuminating unit, and Fig. 8 is a diagrammatic elevation likewise illustrating the optical principles.

Similar reference numerals throughout the several views indicate the same parts.

As is well known to those accustomed to driving automobiles at night, it often happens that the drivers of passing automobiles are unable to gauge properly the extreme limits of each other's cars, and accordingly the automobiles are driven too close together and collide. The brightness of the head lights, together with the lack of effective illumination of the extreme sides of the vehicle, are factors which are apt to cause such accidents.

It has been proposed heretofore to place lamps on the tops of the fenders or mudguards of an automobile, but this does not constitute a fully satisfactory arrangement, partly because the light from these lamps may shine directly forwardly into the eyes of another motorist approaching from the front, and partly because even these lights on the fenders do not effectively illuminate the extreme limits of the vehicle, such, for example, as the outer edges of the fenders. It has also been proposed to place lamps on the bottom of the running board of an automobile, but here the light shines almost entirely laterally or downwardly upon the ground, and is found to be of little benefit to those approaching the automobile from the front or overtaking it from the rear. Also such a light is soon covered with mud and rendered ineffective, and is partially hidden from view by the wheels of the vehicle. Furthermore, prior lights generally either have been blinding to approaching motorists, or have been so dim that they could not be distinguished on account of the glare of bright headlights.

As distinguished from these prior unsatisfactory arrangements, the present invention contemplates the provision of an illuminating unit at the extreme outer edge of the vehicle, thus defining clearly the extreme limit of which another motorist must keep clear in order to avoid an accident. Furthermore, according to this invention, the light from this illuminating unit is so directed that it shines past the edges of the fenders or mud-guards, thus bringing these fenders into sharp relief or silhouette when viewed from in front or behind. Also it is sufficiently bright so that it may be distinguished from the headlights at a distance, and upon closer approach the lights from the novel illuminating unit appears to grow dimmer, so that it is not blinding to another motorist.

Referring now to the drawings, there is shown in Figs. 1 and 2 an automobile body having a front fender 10, a rear fender 11, and a running board 12 between these two fenders in the usual manner. An illuminating unit indicated generally by the numeral 13 is secured to the top of the running board 12, at an intermediate point thereof, so that it is spaced both from the front fender and from the rear fender. This illuminating unit, as clearly shown in Fig. 1, has its outer edge placed substantially flush with the outer edge of the running board 12. The illuminating unit is designed to cast a beam of light forwardly, a second beam of light rearwardly, and preferably also a third beam of light in a lateral direction to serve as a warning to automobiles approaching from the side.

The beam of light which is transmitted forwardly has its axis substantially parallel to the center line of the vehicle, having a very slight outward inclination, so that part of the rays are intercepted and stopped by the fender 10, while other rays graze the extreme edge of the fender and pass forwardly as indicated by the broken lines 14. Preferably the axis of the light rays is inclined slightly upwardly also, as indicated in Fig. 2, so that the eyes of another motorist some distance away from the automobile will be in the path of these rays. As the other motorist approaches the automobile equipped with this novel lighting arrangement, however, his eyes will gradually reach a point above the path of the direct light rays. Thus as the automobile is approached, the light from the unit 13 appears to grow dimmer rather than brighter, which condition is extremely desirable in avoiding glare and the dangers incident thereto. The beam of light is preferably somewhat divergent, and has its upper edge directed slightly upwardly, as above explained, and its lower edge substantially horizontal, as is indicated in Fig. 2.

Similarly, the beam of light transmitted rearwardly falls partly upon and is intercepted by the rear fender 11, while another part of this beam grazes the edge of the rear fender 11 and continues rearwardly as indicated by the lines 15. This beam is preferably also inclined slightly upwardly and very slightly outwardly, in a manner similar to the forwardly directed beam. The outward inclination of both the forward and rearward beams is very small, however, and these beams may be said to be substantially parallel to the center line of the automobile.

When this novel lighting arrangement is used, a person in front of the automobile sees the light projected forwardly past the outer edge of the front fender 10, and thus the edge of this fender is brought into sharp relief or silhouette and is clearly defined, so that a passing motorist can easily ascertain exactly the outline of the automobile which he has to pass. Similarly, to a motorist behind the automobile, the rear fender 11 is brought into sharp relief by the beam 15 of light which passes the rear fender 11, and thus the outline of the automobile is clearly apparent to a motorist overtaking it. Those familiar with the night driving of automobiles will recognize the great advantages of this arrangement and the great reduction in the possibility of accident.

The illuminating unit 13 may be constructed in any suitable manner, but preferably is of the form illustrated in Figs. 3 to 6. Referring now to these figures, the unit comprises a casing 20 having a front aperture or window 21 near the outer end of the casing, and a similar rear window 22, both of which windows may be of semicircular shape if desired. A side window 23 is also provided.

A partition 24 extends across the casing dividing it into a light compartment for containing a source of illumination, and a window compartment having the windows 21, 22 and 23 above mentioned. This partition 24 serves as a supporting means for a condensing lens 25 of suitable form.

Within the light compartment is a suitable holder or socket 26 for an illuminating element such as the incandescent light bulb 27, the holder or socket 26 being adjustably held in a sleeve 28 by a set screw 29 so that the socket may be adjusted to position the filament 30 of the lamp at the proper point. Suitable electric conductors (not shown) lead to the light to supply it with current.

The light emanating from the incandescent filament 30 is received by the condensing lens 25 and transmitted toward the side window 23 of the device. A part of this light is intercepted by suitable reflecting means within the window compartment and caused to pass toward the front and rear windows 21 and 22.

This reflecting means may include, for instance, a vertically extending mirror 35 held in a suitable holder having a horizontal lug 36 at its lower end which is secured to the bottom of the casing by screws 37. This mirror 35 intercepts part of the light transmitted by the condensing lens 25 and reflects it forwardly so that it passes through the front window 21.

A similar mirror 40 held in another holder having a lug 41 secured to the base by screws 42 is placed in position to intercept another part of the light transmitted by the lens 25 and to reflect it rearwardly so that it passes to the rear window 22. It will be observed from Fig. 3 that the two mirrors 35 and 40 are somewhat spaced from each other so as to leave an opening between them, which opening is substantially along the center line passing through the center of the side window 23 and of the filament 30. Accordingly, part of the light from the filament 30 which is collected and transmitted by the condensing lens 25 is not intercepted by the reflecting means, but passes through the space between the mirrors and thus reaches the side window 23.

It has been mentioned above that the beams of light thrown forwardly and rearwardly preferably had their axes inclined slightly upwardly, and were slightly divergent, the lower edge of each beam being substantially horizontal and the upper edge being inclined. In order to accomplish this, the illuminating element is set somewhat below the axis of the condensing lens 25, as will appear clearly from Fig. 4. Preferably the socket or holder 26 is so oriented that the filament 30 of the lamp will extend vertically, and the sleeve 28 is so positioned on the side of the casing that the upper end of the filament 30 will be substantially on the axis of the condensing lens, as shown. With this arrangement, the divergent beam of light transmitted by the lens will have its lower edge horizontal, and the upper edge of the beam will be inclined slightly upwardly. Those parts of the beam which are intercepted and reflected by the mirrors 35 and 40 will still have this upward inclination, of course, so that the front and rear beams of light will have the desired characteristics.

The windows 21, 22 and 23 preferably are provided with glass or other transparent closures, to prevent dust and dirt from entering the casing, and also to color the beams of light in any desired manner. The transparent members 51 and 52 associated with the front and rear windows 21 and 22 respectively are preferably of plain glass, colored in any desired manner, so that they will not affect or alter the paths of the rays of light passing through these windows. The glass 53 associated with the side window 23, however, preferably has a diffusing surface of any suitable type, such as the pebbled surface indicated in Figs. 3, 4 and 5. By the use of such a diffusing surface, the light issuing from the side window 23 will not be in the form of a comparatively narrow beam but will be diffused over a considerable sector, as indicated by the broken lines 54 in Fig. 1. Thus the light from the side window 23 will be visible not only at a point directly opposite this side window but will also be visible for a considerable distance forwardly and rearwardly of a line perpendicular to the center line of the automobile.

The casing 20 has a removable cover 58 fitting over the edges of the casing so that it may be removed to replace the bulb 27 when necessary. The casing may be secured to the running board of the automobile in any suitable manner. Preferably the casing has lugs 60 secured to the sides thereof, which lugs may be fastened to the top of the running board by screws, bolts, or any other suitable means. As has been explained above, the casing 20 of the illuminating unit is fastened to the running board in such position that its outer end or end having the side window 23 therein is substantially flush with the outer edge of the running board. Consequently, the reflecting means 35 and 40 are substantially at the outer edge of the running board and the beams of light sent forwardly and rearwardly by these reflecting means are substantially parallel to the center line of the automobile, as indicated in Fig. 1. Thus these beams have the desirable characteristic of silhouetting the fenders or making them appear in sharp relief to persons in front of and behind the automobile.

Referring now to Figs. 7 and 8 which are diagrammatic views illustrating the optical principles of the device, the filament 30, lens 25, reflecting means 35 and 40, and window glasses 51, 52 and 53 are shown in their optical relationship, disassociated from the casing and other parts of the apparatus. Fig. 8 illustrates clearly the slight upward inclination of the beams of light due to the fact that the source of light 30 is placed slightly below the axis of the lens. Fig. 7 illustrates the three beams of light cast by the illuminating unit, the beam 14 being transmitted forwardly, 15 rearwardly, and 54 laterally. Fig. 7 also illustrates the fact that the mirrors 35 and 40 are placed at such an angle that the inner edges of the beams 14 and 15 will be inclined very slightly inwardly, while the outer edges of these beams will be inclined somewhat outwardly. Since the inmost edges of these beams are intercepted and stopped by the front and rear fenders 10 and 11, there is no necessity for a large inward inclination and preferably such inclination is made just enough so that a small part of the light falls on the fenders, the rest of the beams grazing or passing the edges of the fenders to render them visible in relief from in front and behind.

The color scheme of the beams of light may be arranged in any way desired by the user or required by State laws or local regulations. Ordinarily, the glass 52 of the rear window will be red, so that the rear beam of light 15 is colored red. The diffusing glass 53 of the side window is preferably also red, so that the light thrown laterally by the illuminating unit is red and serves as a warning to persons approaching from the side. The beam of light 14 issuing from the front window 21 may be white, or the glass 51 may be tinted to color it green, amber, or any other desired color.

In use, an illuminating unit such as described above may be placed on each running board of the vehicle, or a single illuminating unit may be used only on the left hand running board. In either case, whether one or two units are employed, the left hand fenders of the automobile will be silhouetted or thrown into sharp relief at night so as to be plainly visible to others passing the vehicle from the front or overtaking it from the rear. This greatly increases the safety of night driving, making it possible for vehicles equipped according to this invention to pass each other with no danger of coming into contact with each other and with no danger of getting too far to the side of the road because of uncertainty as to the location of the limits of the other vehicle.

When a vehicle is equipped with two illuminating units, one on each side, the light from both of these units will be visible to persons directly in front of or directly behind the vehicle and some distance away. Thus when an automobile so equipped is approaching an observer, and is some distance away, the observer will see the silhouette of both right and left hand fenders and will observe the lights, which may be white, green, amber, or any other desired color, and thus not only be informed of the fact that an automobile is coming directly toward him, but also will see the exact limits of size of the automobile. Similarly, an observer behind an automobile equipped with two illuminating units will see two red lights which bring the rear fenders of the automobile into silhouette. These two red lights will indicate to the observer that the automobile is moving in a direction away from him, and he may also see clearly the side limits of the automobile so that he may pass it in safety if he wishes to overtake it.

Since the light from this novel illuminating unit is optically directed in the proper manner and is not wasted, it is found that an incandescent bulb of comparatively small power is sufficient to render the lights plainly visible at night so that they may be distinguished without difficulty even from glaringly bright headlights used on the same automobile. A bulb of from 6 to 12 candlepower is found in practice to give good results in this illuminating unit.

The unit may be used also as a parking light, and will define the limits of the parked automobile so that passing motorists may easily avoid collision therewith.

The advantages of this invention in promoting safe driving and in lessening the chances of accident will be readily apparent and fully appreciated by those who understand the present difficulties and dangers of driving automobiles at high speed at night.

While one embodiment of the invention has been disclosed, it is to be understood that the inventive idea may be carried out in a number of ways. This application is therefore not to be limited to the precise details shown, but is intended to cover all variations and modifications thereof falling within the spirit of the invention or the scope of the appended claims.

I claim as my invention:

1. An illuminating unit for automobiles comprising, in combination, a casing, a front window in said casing, a rear window therein, a side window therein at an angle to said front and rear windows, illuminating means casting a beam of light in a direction toward said side window, and reflecting means intercepting portions of said beam of light to reflect the intercepted portions through said front and rear windows.

2. An illuminating unit for automobiles comprising, in combination, a casing having front, rear, and side windows, said side windows being at an angle to said front and rear windows, an illuminating element, a condensing lens for collecting light from said illuminating element and for transmitting light toward said side window, reflecting means intercepting a portion of said transmitted light for reflecting it to said front window, and a second reflecting means intercepting another portion of said transmitted light for reflecting it to said rear window, said second reflecting means being spaced from said first reflecting means to provide an opening for passage of light to said side window.

3. An illuminating unit for automobiles comprising, in combination, a casing, a partition dividing said casing into a window compartment and a light compartment, said window compartment having front, rear, and side windows, a source of illumination in said light compartment, a condensing lens in said partition to transmit light from said source of illumination into said window compartment and in a direction toward said side window, a mirror intercepting part of the light transmitted by said condensing lens to reflect it through said front window, and a second mirror intercepting another part of the light transmitted by said condensing lens to reflect it through said rear window, said mirrors being spaced from each other to provide an opening through which light from said condensing lens may pass to and through said side window.

4. The combination with an automobile including front and rear fenders, and a running board between said fenders, of a source of illumination, a condensing lens for receiving and transmitting light from said source of illumination, and reflecting means mounted on said running board substantially at the outer edge thereof in position to intercept light transmitted by said condensing lens and reflect it forwardly past said front fender in a direction substantially parallel to the center line of the automobile, so that said fender will appear in sharp relief to a person in front of said automobile.

5. The combination with an automobile including front and rear fenders, and a running board between said fenders, of a condensing lens having its axis substantially horizontal, a source of illumination having its center slightly below the axis of said condensing lens, so that light received by said lens from said source of illumination will be transmitted with a slight upward inclination, and means for directing light from said lens past the edge of said front fender in a direction substantially parallel to the center line of the automobile, so that said fender will appear in sharp relief to a person in front of said automobile.

6. An illuminating unit for automobiles, comprising in combination, a casing having front, rear, and side windows, condensing lens mounted within said casing, an illuminating element offcentered with respect to the axis of said lens so that light from said element will be transmitted by said lens in a direction slightly inclined to the axis of the lens, reflecting means intercepting a portion of said transmitted light to reflect it to said front window, and a second reflecting means intercepting another portion of said transmitted light for reflecting it to said rear window, said second reflecting means being spaced from said first reflecting means to provide an opening for passage of light to said side window.

7. The combination with an automobile including front and rear fenders and a running board between said fenders, of a light source mounted on the top of said running board inwardly of the outer edge thereof in position to project light outwardly toward said edge, and light reflecting means on top of said running board substantially at said outer edge thereof in position to intercept light from said source and reflect such intercepted light past the outer edge of one of said fenders at a slightly upward inclination and substantially along a plane parallel to the center line of said automobile.

8. The combination with an automobile including front and rear fenders and a running board between said fenders, of a light source mounted on the top of said running board inwardly of the outer edge thereof in position to project light outwardly toward said edge, and a pair of light reflecting elements on top of said running board substantially at the extreme outer edge thereof in position to intercept light from said source and reflect such intercepted light past the outer edges of both of said fenders in a plane substantially parallel to the center line of said automobile.

9. The combination with an automobile including front and rear fenders and a running board between said fenders, of a light source mounted on the top of said running board, and means including a lens for projecting a relatively narrow beam of optically directed and controlled light from said source past the outer edge of one of said fenders to indicate the extreme edge of said fender at night.

10. The combination with an automobile including front and rear fenders and a running board between said fenders, of a light source mounted on the top of said running board, and means including a lens and a reflecting element for projecting a relatively narrow beam of optically directed and controlled light from said source past the outer edge of one of said fenders substantially parallel to the center line of said automobile and at a slightly upward inclination.

HENRY F. KURTZ.